United States Patent
Park et al.

(10) Patent No.: US 9,941,939 B2
(45) Date of Patent: Apr. 10, 2018

(54) METHOD AND APPARATUS FOR TRANSMITTING OR RECEIVING RACH SIGNAL IN BEAMFORMING SYSTEM

(71) Applicant: Samsung Electronics Co., Ltd., Gyeonggi-do (KR)

(72) Inventors: Jeong-Ho Park, Seoul (KR); Kyung-Whoon Cheun, Seoul (KR); Won-Il Roh, Gyeonggi-do (KR); Jae-Weon Cho, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 271 days.

(21) Appl. No.: 14/284,189

(22) Filed: May 21, 2014

(65) Prior Publication Data

US 2014/0348051 A1 Nov. 27, 2014

(30) Foreign Application Priority Data

May 21, 2013 (KR) .................. 10-2013-0056863

(51) Int. Cl.
*H04B 7/04* (2017.01)
*H04W 4/00* (2009.01)
(Continued)

(52) U.S. Cl.
CPC ............ *H04B 7/0408* (2013.01); *H04W 4/00* (2013.01); *H04W 72/005* (2013.01);
(Continued)

(58) Field of Classification Search
CPC ............ H04W 74/0866; H04W 16/28; H04W 72/046; H04B 7/0408; H04B 7/0617; H04B 7/1855
See application file for complete search history.

(56) References Cited

U.S. PATENT DOCUMENTS 8,488,620 B2 7/2013 Cho et al.
2006/0164969 A1* 7/2006 Malik .................. H04B 7/0408
370/203
(Continued)

FOREIGN PATENT DOCUMENTS

KR 2008-0016367 A 2/2008
WO WO 2010/104977 A1 9/2010
(Continued)

OTHER PUBLICATIONS

International Search Report dated Aug. 26, 2014 in connection with International Application No. PCT/KR2014/004540; 3 pages.
(Continued)

*Primary Examiner* — Omer S Mian (57) ABSTRACT

A method for operating a random access channel (RACH) by a base station (BS) performing beamforming with at least one receive chain includes broadcasting RACH configuration information; and receiving an RACH signal with at least one receive chain, wherein the RACH configuration information includes threshold information to divide an RACH groups into a first group and a second group. A BS for operating a RACH by performing beamforming with at least one receive chain in a communication system, the BS comprising a controller configured to broadcast RACH configuration information and control at least one receive chain to receive an RACH signal, wherein the RACH configuration information includes threshold information to divide RACH groups into a first group and a second group. Other embodiments including a user equipment are also disclosed.

14 Claims, 7 Drawing Sheets

(51) Int. Cl.
| | |
|---|---|
| *H04W 74/08* | (2009.01) |
| *H04W 72/00* | (2009.01) |
| *H04B 7/0408* | (2017.01) |
| *H04W 74/00* | (2009.01) |
| *H04W 4/06* | (2009.01) |
| *H04W 4/08* | (2009.01) |

(52) U.S. Cl.
CPC ... *H04W 74/0833* (2013.01); *H04W 74/0866* (2013.01); *H04W 4/06* (2013.01); *H04W 4/08* (2013.01); *H04W 74/006* (2013.01)

(56) References Cited

U.S. PATENT DOCUMENTS

| | | | |
|---|---|---|---|
| 2007/0238410 A1* | 10/2007 | Tegreene | H04L 67/125 455/25 |
| 2008/0043771 A1 | 2/2008 | Cho et al. | |
| 2010/0232318 A1 | 9/2010 | Sarkar | |
| 2010/0296467 A1 | 11/2010 | Pelletier et al. | |
| 2012/0320842 A1 | 12/2012 | Jeong et al. | |
| 2013/0083749 A1 | 4/2013 | Xu et al. | |
| 2013/0331081 A1* | 12/2013 | Rune | H04B 7/0408 455/418 |
| 2015/0373740 A1* | 12/2015 | Eriksson | H04W 74/0833 370/329 |

FOREIGN PATENT DOCUMENTS

| | | |
|---|---|---|
| WO | 2012115553 A1 | 8/2012 |
| WO | 2012173565 A1 | 12/2012 |

OTHER PUBLICATIONS

Written Opinion of International Searching Authority dated Aug. 26, 2014 in connection with International Application No. PCT/KR2014/004540; 6 pages.

European Patent Office, "European Search Report," Application No. 14801817.9, dated Oct. 21, 2016, 11 pages, publisher EPO, Munich, Germany.

* cited by examiner

METHOD AND APPARATUS FOR TRANSMITTING OR RECEIVING RACH SIGNAL IN BEAMFORMING SYSTEM

CROSS-REFERENCE TO RELATED APPLICATION AND CLAIM OF PRIORITY

The present application is related to and claims the benefit under 35 U.S.C. § 119(a) of Korean Patent Application No. 10-2013-0056863 filed on May 21, 2013 in the Korean Intellectual Property Office, the entire disclosure of which is hereby incorporated by reference.

TECHNICAL FIELD

The present disclosure relates to a Random Access Channel (RACH) operating scheme for efficiently managing groups covered by RACH and RACH transmission resources in a beamforming system.

BACKGROUND

Wireless communication systems have taken a step to support higher transfer ratio to meet increasing wireless data traffic demand.

Among them, the fourth generation (4G) communication system has been evolved mainly for improvement of spectral efficiency based on communication technologies like Orthogonal Frequency Divisional Multiple Access (OFDMA), Multiple Input Multiple Output (MIMO), etc., in order to increase the data transfer ratio. However, only the improvement of spectral efficiency may hardly meet the soaring wireless data traffic demand.

Today's increasing demand of smartphones and tablets and increase in associated applications in need of greater data traffic are fueling the data traffic demand. A way of addressing the increase in data traffic is to use ultra wideband frequencies in the ultrahigh-frequency domain.

In case of wireless communication in the ultrahigh-frequency band, by nature of frequency characteristics, propagation loss, such as path loss, shadow fading, reflection loss, or the like may increase. This may shorten the (effective) distance of arrival of ultrahigh-frequencies, causing significant decrease in coverage of wireless communication services in the ultrahigh-frequency domain.

On the other hand, since the ultrahigh-frequency has a very short wavelength, it is easy to apply beamforming with multiple small antennas. Accordingly, mitigation of the propagation path loss with the beamforming technology may increase the propagation distance of radio waves and thus possibly expand service areas.

Beamforming based systems may apply the beamforming technique not only to the data channel but also to the control channel, i.e., beamforming may be applied and operated for Synchronization Signals (SSs) for obtaining synchronization of downlink (DL) or Random Access Channels (RACHs) of uplink (UL).

SUMMARY

To address the above-discussed deficiencies, it is a primary object to provide an efficient beamforming operation scheme for expanding Random Access Channel (RACH) coverage.

The present disclosure also provides a scheme for a Base Station (BS) to flexibly operate limited hardware resources between data channel and RACH channel.

The present disclosure also provides an operation scheme of a BS and User Equipment (UE) for RACH signal transmission/reception by dividing an RACH group by two or more classes.

The present disclosure also provides a scheme for a UE to determine an RACH group to which the UE belongs and accordingly transmit/receive RACH signals.

The present disclosure also provides an operation scheme to achieve optimization of RACH performance and reduce pollution by minimizing collision of RACH resources transmissions between UEs.

In accordance with an aspect of the present disclosure, provided is a method for operating a Random Access Channel (RACH) by a Base Station (BS) that performs beamforming with at least one receive chain in a communication system. The method includes broadcasting RACH configuration information, and receiving an RACH signal with at least one receive chain, wherein the RACH configuration information includes threshold information to divide an RACH group of the BS into first and second groups.

In accordance with another aspect of the present disclosure, provided is a method for sending a Random Access Channel (RACH) signal by User Equipment (UE) in a communication system. The method includes receiving RACH configuration information broadcast from a Base Station (BS), and estimating a metric and sending an RACH signal based on the received RACH configuration information and the estimated metric, wherein the RACH configuration information includes threshold information to divide RACH groups into first and second groups.

In accordance with an aspect of the present disclosure, provided is a Base Station (BS) for operating a Random Access Channel (RACH) by performing beamforming with at least one receive chain in a communication system. The BS includes a controller configured to broadcast RACH configuration information and control at least one receive chain to receive an RACH signal, wherein the RACH configuration information includes threshold information divide an RACH group into first and second groups.

In accordance with an aspect of the present disclosure, provided is a User Equipment (UE) for sending a Random Access Channel (RACH) signal in a communication system. The UE includes a controller configured to receive RACH configuration information broadcast from a Base Station (BS), and estimate a metric of the UE and send an RACH signal based on the received RACH configuration information and the estimated metric, wherein the RACH configuration information includes threshold information to divide RACH groups into first and second groups.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Embodiments of the disclosure now will be described more fully hereinafter with reference to the accompanying drawings, in which the illustrative embodiments of the disclosure are shown. The embodiments may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the embodiments of the present disclosure. As used herein, the singular forms "a", "an" and "the" are intended to include the plural forms as well, unless the context clearly indicates otherwise. It will be further understood that the terms "comprises" and/or "comprising," when used in embodiments of the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Prior to explaining embodiments of the present disclosure, several terms used in this specification will be described first. However, it will be appreciated that those terms are not limited to what will be described below.

A base station is an entity for communicating with a user equipment and can also be referred to as BS, Node B (NB), eNode (eNB), Access Point (AP), etc. Only for a Random Access Channel (RACH) signal in particular, the BS serves as a receiving station in relation to the user equipment.

User equipment is an entity for communicating with the BS and can also be referred to as UE, Mobile Station (MS), Mobile Equipment (ME), device, terminal, etc. Only for a Random Access Channel (RACH) signal in particular, the UE serves as a transmitting station in relation to the BS.

The RACH is commonly referred to as an arbitrary access channel in uplink on which the UE can send a request for allocation of a control channel to the BS. For example, the RACH is a channel used by the UE to send a request for a traffic channel to the BS over a network or used by the UE to send a response to a message received on a paging channel to the BS, and corresponds to e.g., a Physical Random Access Channel in a Long Term Evolution (LTE) system or a ranging channel in an Institute of Electrical and Electronics Engineers (IEEE) 802.16m system. For RACH communication, the UE can use an arbitrary access method to try to make an initial access to the BS with set power and, if the access is failed, re-try to access the BS with gradually increased power. The RACH signal is a signal communicated between the UE and the BS on the RACH channel, which can be, for example, a random access preamble message of LTE or Ranging Request (RNG-REQ) message of IEEE 802.16m. The term RACH operation can mean to operate the RACH channel, i.e., mean to perform any of operations of allocation of RACH resources, transmission and/or reception of RACH signals.

An RACH group is a group managed by the BS, and the UE can determine the RACH group to which it belongs by using an estimated metric. The RACH group (or a UE belonging to the group) can operate uplink resources, an RACH transmission opportunity period, a receive beam sweep period in beamforming, or a RACH response period differently from other RACH groups. The concept of RACH group can include an RACH coverage which refers to a geographical area, as a subordinate concept.

The expression of 'sending (or transmitting) or receiving a channel' as used herein can mean that a signal or message is sent or received on the channel.

Figure 1:
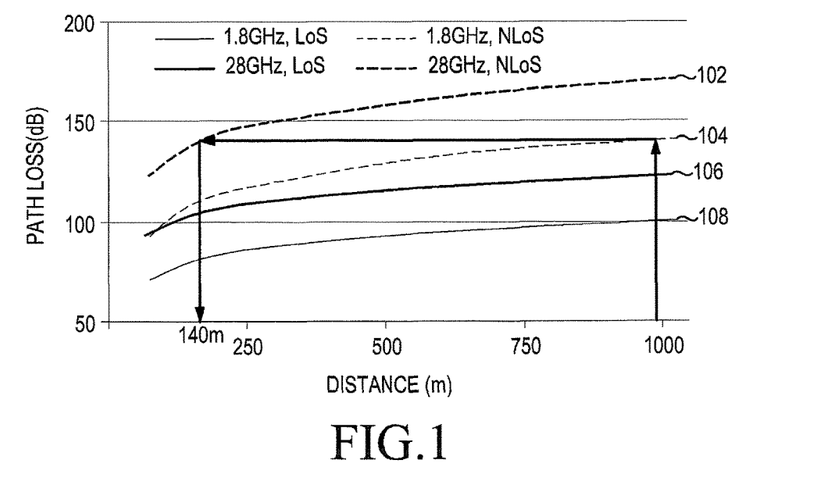
FIG. 1 is a graph representing measurements of path loss according to ranges in environments of respective existing cellular frequency band and ultra-frequency band.

FIG. 1 is a graph representing measurements of path loss according to ranges in environments of respective existing cellular frequency band and ultra-frequency band.

In case of the third generation (3G) communication system or the fourth generation (4G) communication system like an LTE system, a frequency band of approximately 450 MHz to 3.6 GHz is used for cellular communication.

Thick dotted line 102 represents results of measuring frequencies of 28 GHz band as an example of the ultra-frequency band under Non Line of Sight (NLos) conditions, and thin dotted line 104 represents results of measuring frequencies of 1.8 GHz band as an example of the existing cellular band under NLoS conditions. Thick solid line 106 represents results of measuring frequencies of 28 GHz band under Line of Sight (LoS) conditions, and thin solid line 108 represents results of measuring frequencies of 1.8 GHz band under LoS conditions.

Measurements shown in FIG. 1 came under conditions that RACH bandwidth (BW) is 787.5 KHz and required Signal to Noise Ratio (SNR) is −5.4 dB. The Path Loss (PL) can be expressed by Equation (1) as follows:

$$PL=36.7*\log_{10}d+22.7+26*\log_{10}f^c, \quad (1)$$

where d represents a distance in meters between a sending end and a receiving end. Fc represents an operating frequency in GHz.

Referring to FIG. 1, since path loss 104 of a system using the existing cellular band (e.g., 1.8 GHz band) is not greater than path loss 102 of the ultra-high frequency band (e.g., 28 GHz band), it can be seen that frequencies in the existing cellular band can cover a cell with radius up to about 1 Km if a threshold of −140 dB path loss is applied under NLoS conditions. Given that common urban cells have the radius of about 290 m and the Inter Site Distance (ISD) is about 500 m, even if an RACH channel is designed using frequencies in the existing cellular band (e.g., 1.8 GHz), it can be accepted in terms of system overhead. For this reason, today's 3G or 4 G communication systems do not assume transmit and receive beamforming in RACH operation.

On the contrary, there occurs considerable path loss in the ultra-high frequency band (e.g., 28 GHz band) as compared to the existing cellular band. The line 102 of FIG. 1 reveals a phenomenon of a great reduction in cell radius due to the considerable path loss of the ultra-high frequency band. Under the same condition (i.e., under the NLoS condition with the threshold of −140 dB path loss), if the existing cellular band can cover a cell radius of about 1 Km, the ultra-high frequency band (e.g., 28 GHz band) can cover a cell radius of about 140 m. In other words, designing an RACH channel to cover a cell radius as great as in the existing cellular band in the ultra-frequency band means that it has to take considerable path loss and thus significant inefficiency in terms of the system overhead.

As a method for covering a great cell radius while reducing the system overhead by reducing the path loss that occurs in the ultra-high frequency band, a method for applying beamforming to a communication system can be considered.

In a communication system that employs beamforming, the BS can broadcast RACH configuration information to UEs, the RACH configuration information corresponding to respective operating patterns for the UEs to operate various beam patterns, and the UE that receives the RACH configuration information can try to send an RACH signal using the RACH configuration information.

In UL RACH signal transmission, as UE uses a narrower BW of a frequency resource and a wider BW of a time resource, a noise power can be decreased and a receive SNR of the BS can be improved, thereby achieving an effect of widening the RACH coverage. That is, to expand the RACH coverage, it is advantageous to use a narrower BW of a frequency resource.

Accordingly, in RACH signal transmission, it is advantageous to apply Frequency Divisional Multiplexing (FDM) between the RACH and the data channel, in which the RACH is sent in a narrow BW while the data channel (e.g., Physical Uplink Shared CHannel (PUSCH) of LTE) is sent in other BWs. Furthermore, for receive beamforming operation, the BS receiving the RACH signal to which FDM is applied as well as the data channel, has to operate hardware for receiving the RACH signal (e.g., a receiver chain) separately from hardware for receiving the data channel, to better receive the RACH signal. To actively take care of the coverage that is changing in real time according to parameters, such as a distance between the BS (RACH receiving station) and UE (RACH transmitting station) or a barrier in the way that causes the path loss, i.e., to provide flexibility of the RACH coverage, it is easy for the BS to operate various beamforming patterns to receive the RACH signal.

However, considering limitations on the hardware resource of the BS, it is difficult to secure and operate sufficient hardware dedicated only to the RACH and to operate various beamforming patterns for receiving the RACH signal. That is, with the limited hardware resource of the BS, it is hard to perform FDM operation on the data channel and RACH while providing flexibility of the RACH coverage.

Figure 2:
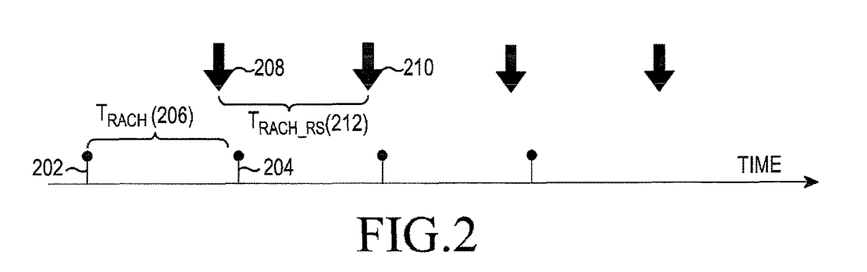
FIG. 2 schematically illustrates Random Access Channel (RACH) transmission/reception between a UE and a Base Station (BS) in a system for which beamforming is not applied, according to an embodiment of the present disclosure.

FIG. 2 schematically illustrates RACH transmission and/or reception between a UE and a Base Station (BS) in a system (e.g., 3G or 4G system) for which beamforming is not applied, according to an embodiment of the present disclosure.

Prior to receiving the RACH signal from the UE, the BS can establish an interval of RACH opportunities, an interval of RACH responses, and UL resources to be used for an RACH channel, and broadcast RACH configuration information that includes information regarding the intervals and UL resources to UEs. UE that receives the broadcast RACH configuration information can try to send the RACH signal in sync with the interval of RACH opportunities included in the configuration information if it needs to send the RACH signal or try to receive the RACH response from the BS in sync with the interval of RACH responses included in the configuration information, and confirm whether it was successful.

In FIG. 2, the time line has RACH opportunities 202, 204, illustrated as straight pins with big heads, and RACH responses 208 and 210, illustrated as downward arrows. $T_{RACH}$ 206 represents an interval between RACH opportunities, and $T_{RACH\_RS}$ 212 represents an interval between RACH responses.

When the BS establishes RACH opportunities (or their intervals) for an arbitrary (or predetermined) UL RACH group, a UE located outside of the RACH group can increase the number of attempts to send the RACH signal to have more RACH opportunities to send the RACH signal. The increased number of retransmission of the RACH signal can lead to increased transmit power. Accordingly, the UE can have increased RACH latency, and the increased number of attempts to send the RACH signal can act on other UEs as pollution or noise. The RACH latency can be represented as an average RACH success time.

Figure 3:
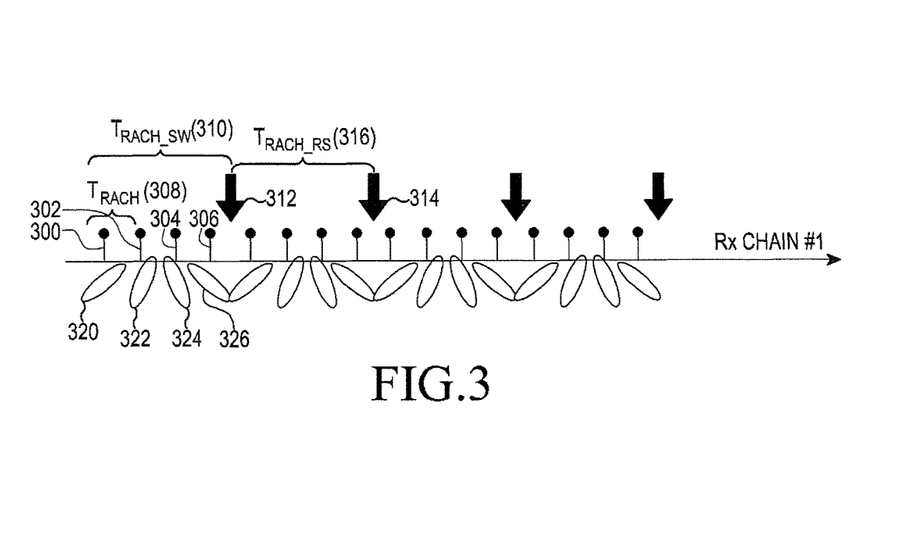
FIG. 3 schematically illustrates RACH transmission/reception between a UE and a BS in a beamforming system, according to an embodiment of the present disclosure.

FIG. 3 schematically illustrates RACH transmission and/or reception between a UE and a BS in a beamforming system, according to an embodiment of the present disclosure.

With receive beamforming applied to the RACH operation, the BS can perform receive beamforming in all beam directions within a receive (Rx) beam sweep period, gather all the results of performing the receive beamforming, detect the RACH signal, and send a RACH response to the UE.

The BS can set $T_{RACH\_SW}$ and $T_{RACH\_RS}$ and allocate the BS's hardware chain (hereinafter, referred to as Rx chain) to be used in Rx beamforming. The Rx chain will be described later in more detail in connection with FIGS. 4A and 4B.

In FIG. 3, Rx Chain No. 1 has RACH opportunities 300, 302, 304, and 306, illustrated as straight pins with big heads, and RACH responses 312 and 314, illustrated as downward arrows. $T_{RACH}$ 308 represents an interval after one RACH opportunity 300 until next RACH opportunity 302, i.e., an RACH opportunity period. $T_{RACH\_SW}$ 310 is an interval in which the BS (especially, the Rx chain) sweeps Rx beams in all directions 320, 322, 324, and 326 and performs Rx beamforming on them, i.e., Rx beam sweep period, which includes all the RACH opportunities 300, 302, 304, and 306 subject to the Rx beamforming for a set of directions. Since two or more beam directions are included in the set, the Rx beam sweep period can be an integer (2 or more) multiple of the RACH opportunity period. $T_{RACH\_RS}$ 316 represents an interval after one RACH response 312 until next RACH response 314, i.e., an RACH response period.

Figure 4A:
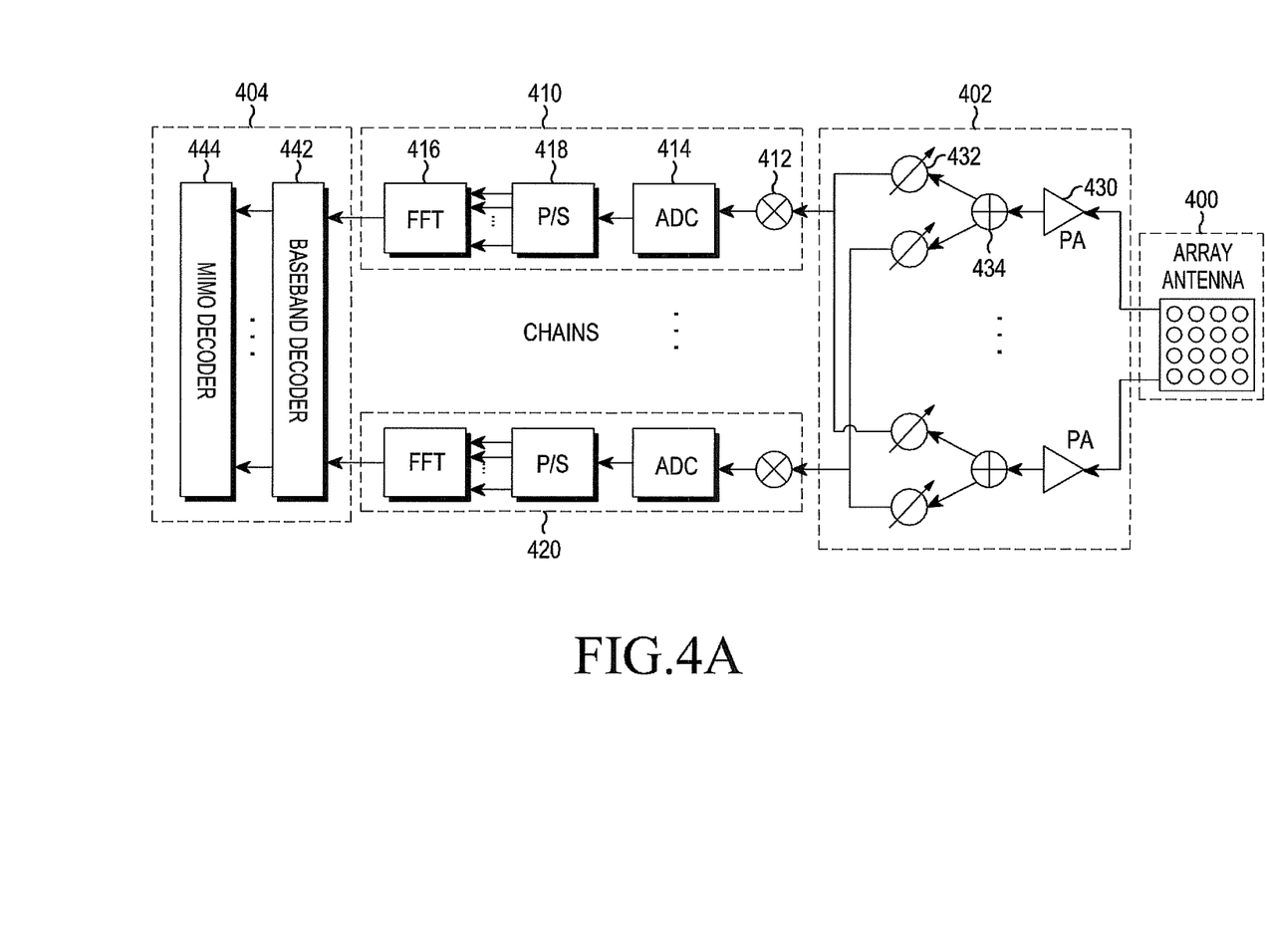
FIG. 4A is a block diagram of a receiving part of a BS, according to an embodiment of the present disclosure.
Figure 4B:
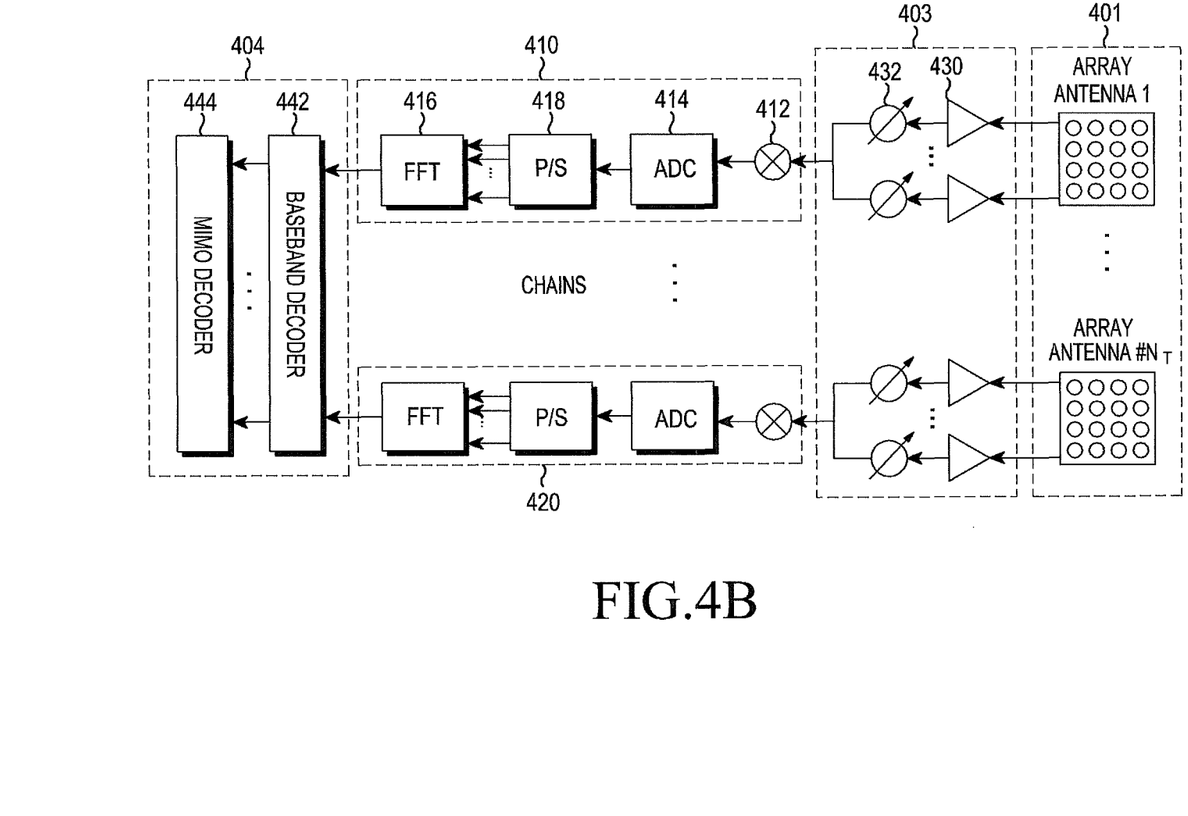
FIG. 4B is a block diagram of a receiving part of a BS, according to another embodiment of the present disclosure.

FIGS. 4A and 4B are block diagrams of receiving parts of the BS, according to embodiments of the present disclosure.

Specifically, FIG. 4A shows two or more Rx chains sharing one array antenna included in an antenna unit 400, and FIG. 4B shows two or more Rx chains using respective array antennas included in the antenna unit 401. For example, if a particular array antenna is allocated to be used by a particular Rx chain, it can operate as shown in FIG. 4B. Any embodiments of FIGS. 4A and 4B can perform beamforming per Rx chain.

A BS for performing Rx beamforming can include an antenna unit 400 or 401, a beamforming unit 402 or 403, one or more Rx chains 410, 420, and a modem 404. The BS can further include a controller (not shown) to control operations of the antenna unit 400 or 401, beamforming unit 402 or 403, Rx chains 410, 420, and modem 404.

The antenna unit 400 or 401 is a set of one or multiple antennas, i.e., array antennas, including multiple array elements for receiving wireless signals.

The beamforming unit 402 or 403 performs beamforming on a signal received through the antenna unit 400 or 401. Specifically, the beamforming unit 402 or 403 controls the phase of signals received through the one or more antennas, and performs Rx beamforming by (selective) accumulation. The beamforming unit 402 or 403 can include at least one of one or more Power Amplifiers (PAs) 430, one or more phase shifters 432, and one or more signal accumulators 434. The PA 430 in particular can be included in the Rx chain 410, in which case the PA 430 may not be included in the beamforming unit 402 or 403. If there is only one phase shifter 432 included in the beamforming unit 402 or 403, or if a separate array antenna is used per chain as shown in FIG. 4B, the signal accumulator 434 may not be included in the beamforming unit 402 or 403.

The Rx chain 410 receives a received signal in the RF band from the beamforming unit 402 or 403, and converts the signal into a digital form. Specifically, the Rx chain 410 can include one or more of a mixer (or up converter) 412 and an Analog to Digital Converter (ADC) 414. Optionally, the Rx chain 410 can further include one or more of a PA, a Fast Fourier Transformer (FFT) 416, and a Parallel/Serial (P/S) converter 418. In particular, if included in the beamforming unit 403, the PA 430 may not be included in the Rx chain 410. Two or more Rx chains 410, 420 can be included in the BS, and accordingly, the BS can form multiple Rx beams as many as the number of Rx chains 410, 420, simultaneously.

The modem 404 can divide a baseband signal provided from the Rx chain 410, 420 into symbols (e.g., Orthogonal Frequency Division Modulation (OFDM) symbols) and reconstruct the Rx bitstream by performing demodulation and decoding. The modem 404 can include one or more of a baseband decoder 442 for decoding a baseband signal and a Multiple Input Multiple Output (MIMO) decoder 444.

The controller can control the components of the BS including the Rx chain to perform RACH reception/response and the beamforming operations. Unless otherwise mentioned, it should be noted that operations of the BS as will be discussed below correspond to operations of the controller.

The BS can include multiple Rx chains to form multiple Rx beams, and apply them for RACH operation by predetermining an Rx chain to detect the RACH signal and an Rx chain to detect the data channel. The number of Rx chains to be used for RACH operation can be determined by taking into account performance required for a largest group and the RACH channel (e.g., RACH latency, detection missing performance, false alarm performance, etc.), and in the embodiment of FIG. 3, one Rx chain (Rx chain #1) is allocated for RACH signal detection.

The BS can perform multiclass division on an RACH group based on the size. For example, the BS can set a first class group to have cell radius equal to or less than 290 m, a second class group to have cell radius equal to or less than 500 m, and a third class group to have cell radius more than 500 m. The UE can then determine which class group it belongs to by metric estimation using a received signal. For example, if the metric estimation reveals that a downlink Signal-to-Interference-plus-Noise Ratio (SINR) has equal to or more than −3 dB, the UE can determine that it belongs to the first class group. In another example, if the metric estimation reveals that the path loss has equal to or more than −140 dB, the UE can determine that it belongs to the first class group. In yet another example, if the metric estimation reveals that Received Signal Strength (RSS) of a downlink signal is equal to or more than −80 dBm, the UE can determine that it belongs to the first class group. The numerical value of the cell radius per class (e.g., 290 m) is only an example and can be any value. In other words, it will be noted that the aforementioned numerical values are not intended to limit the scope of the present disclosure.

The BS can also set an Rx chain to be used by each group, and operation times for each group to operate the Rx chain (an RACH opportunity period and an Rx beam sweep period), and differently combine beamforming operation methods per Rx chain at the operation times. Since a beamforming weight, a value input to the phase shifter 432 of the beamforming unit 402 or 403 depends on the combined beamforming operation method per Rx chain, the determination of the beamforming weight can be understood to have the same meaning as determination of a beamforming operation method.

Figure 5A:
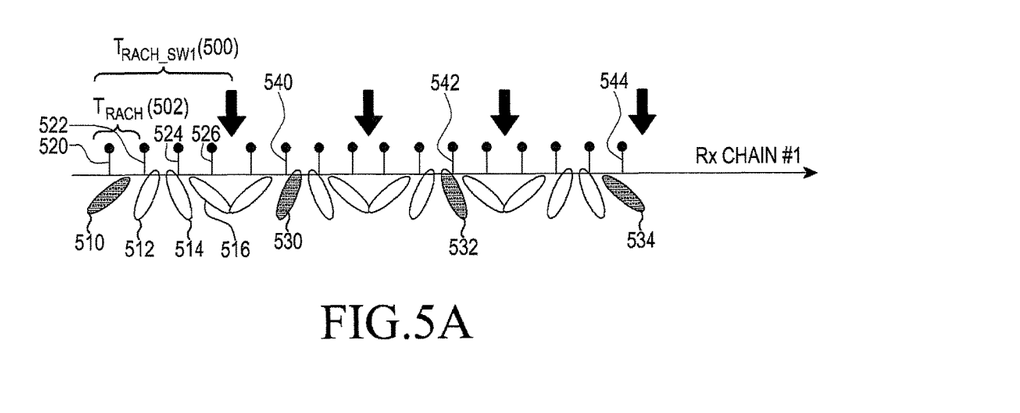
FIGS. 5A and 5B schematically illustrate RACH transmission and/or reception between a UE and a BS in a beamforming system, according to another embodiment of the present disclosure.
Figure 5B:
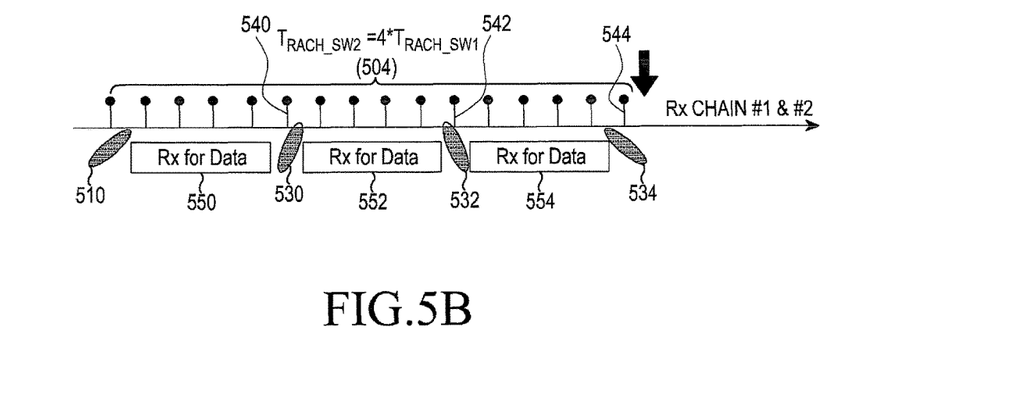

FIGS. 5A and 5B schematically illustrate RACH transmission and/or reception between a UE and a BS in a beamforming system, according to another embodiment of the present disclosure.

A beamforming operation method that uses one or more Rx chains in RACH signal detection for multiple groups will be described in more detail in connection with FIGS. 5A and 5B.

In the embodiment shown in FIGS. 5A and 5B, the RACH groups are divided into two classes. One class with a relatively small coverage can be referred to as a first class or first group, and the other class with a relatively large coverage can be referred to as a second class or second group. Of course, the first and second classes can be switched their coverages each other.

FIG. 5A illustrates RACH operation between the UE and the Rx chain #1 410 allocated for the first group in the BS.

The BS can enable the UE to receive the RACH configuration information and use the RACH configuration information for RACH transmission by broadcasting one or more of an RACH opportunity period $T_{RACH}$ 502, an Rx beam sweep period $T_{RACH\_SW}$ 1500, and information on uplink RACH resources corresponding to the respective periods (and their transmission opportunities) in the RACH configuration information. The broadcast RACH configuration information can further include an RACH response period. The uplink RACH resource can refer to a radio resource, meaning frequency and/or time resources allocated for the uplink RACH channel.

The BS can set $T_{RACH}$ 502 as the RACH opportunity period (or interval), and perform Rx beamforming per direction once at every RACH opportunity interval. The BS can also set $T_{RACH\_SW1}$ 500 as an Rx beam sweep period of the first group, perform Rx beamforming in a set of directions 510, 512, 514, and 516 by performing Rx beamforming for the period 500 at the RACH opportunity intervals, and detect RACH signals.

FIG. 5B illustrates the RACH operation between the UE and the Rx chain #1 410 and Rx chain #2 420 allocated for the second group in the BS.

The BS can further allocate the Rx chain #2 420 for detection of RACH signals. The Rx chain #2 420 has a different RACH Rx beamforming period from that of the Rx chain #1 410. Specifically, for example, $T_{RACH\_SW2}$ 504, which is a minimum period in which the receive chain #2 420 can perform Rx beamforming for a set of directions, i.e., an Rx beam sweep period of the second group, is set to be four times the minimum period in which the Rx chain #1 410 can perform Rx beamforming for a set of directions, i.e., an Rx beam sweep period of the first group, $T_{RACH\_SW1}$ 1500. That is, $T_{RACH\_SW2}=4*T_{RACH\_SW1}$. For such reason, an RACH response period of the Rx chain #2 420 can be four times the RACH response period of the Rx chain #1 410.

However, the Rx beam sweep period of the second group is not exclusively four times the Rx beam sweep period of the first group. It can also be two times or more than four times. The times of the Rx beam sweep period of the second group relative to that of the first group, i.e., the multiple can be selected to fit the surroundings of the communication system.

The smaller the multiple is, the less the RACH latency for UEs in the second group is but relatively, the more frequently the RACH signal transmission of the UE occurs, leading to big pollution (or noise) and reduction in opportunity to use the Rx chain for receiving the data channel. On the contrary, the greater the multiple is, the greater the RACH latency for UEs in the second group is but relatively, the less frequently the RACH signal transmission of the UE occurs, leading to less pollution (or noise) and increase in opportunity to use the Rx chain for receiving the data channel. As such, by properly changing the multiple, Rx chains of the BS can be flexibly operated between data channel and RACH channel.

The Rx chain #1 410 can perform Rx beamforming for the set of directions 510, 512, 514, and 516 at four RACH opportunities 520, 522, 524, and 526 included in the Rx beam sweep period of the first group. While the Rx chain #1 410 performs Rx beamforming for the set of all directions, the Rx chain #2 420 can perform Rx beamforming only one time.

As opposed to the Rx chain #1 410, the Rx chain #2 420 can perform Rx beamforming for the set of directions 510, 530, 532, and 534 once at every RACH opportunity 520, 540, 542, and 544 in the Rx beam sweep period of the first group within the Rx beam sweep period of the second group. Accordingly, in order for the Rx chain #2 420 to perform Rx beamforming for all the four directions 510, 530, 532, and 534, it takes the Rx chain #1 410 a period to perform Rx beamforming for four sets of the directions, i.e., the Rx beam sweep period of the second group is spent.

In other words, a UE that belongs to the second group does not need to send the RACH signal at every RACH opportunity but only need to send the RACH signal once every Rx beam sweep period of the first group. This can considerably reduce the number of times of RACH signal transmission and thus reduce pollution and noise that occurs due to repetitive RACH signal transmission of the UE.

In the meantime, the Rx chain #2 420 can receive the data channel 550, 552, and 554 during the period exclusive of the four RACH opportunities 520, 540, 542, and 544, i.e., during the period in which no RACH reception is performed. Accordingly, operation of the classified RACH group in accordance with an embodiment of the present disclosure can facilitate efficient utilization of limited hardware resources (chains).

It has thus far been described that the beamforming operation method is differently applied to each of the two Rx chains #1 and #2 410 and 420 allocated for RACH reception of the second group. In accordance with another embodiment of the present disclosure, it is possible to apply the same operation method for the two Rx chains #1 and #2 410 and 420 allocated for RACH reception of the second group. In this case, a beamforming operation method for the Rx chain #1 410 allocated for RACH reception of the second group can also be applied for the Rx chain #2 420 allocated for RACH reception of the second group. More specifically, even the Rx chain #1 410 does not perform Rx beamforming at every RACH opportunity but perform Rx beamforming only once in every Rx beam sweep period of the first group $T_{RACH\_SW1}$. Thus, the Rx chain #1 410 can perform Rx beamforming for a set of directions in the Rx beam sweep period of the second group.

In FIG. 5, given that the time index of the RACH opportunity for the first group is represented by 'i' and the time index of the RACH opportunity for the second group is represented by 'j', relation between i and j can be j=4*i+i. That is, when i=0, 1, 2, 3, 4, 5, 6, . . . , j=0, 5, 10, 15, . . . .

To sum up what are illustrated in FIGS. 5A and 5B, the first group is determined by beamforming operations performed only by the Rx chain #1 410, and the second group is determined by beamforming operations not only by the Rx chain #1 410 but also by the Rx chain #2 420.

The first group is advantageous in that a complete period $T_{RACH\_SW1}$ of Rx beamforming for a set of directions is short and corresponding RACH response period is also short, leading to less RACH latency. In this case, the BS can have small coverage because only one Rx chain is used for reception, but UEs of the first group to be mostly located in the center of a cell have high possibility of RACH signal transmission and thus reduce the RACH latency by operating the RACH at short intervals.

On the contrary, the second group can serve a greater service area than that of the first group by receiving the RACH signal with both Rx chains #1 and #2. With respect to the second group, since an Rx beamforming configuration period for a set of directions, $T_{RACH\_SW2}$, gets long and the corresponding RACH response period also gets long, the RACH latency can be greater, but UEs of the second group to be mostly located around the edge of a cell inherently have great RACH latency due to repetitive RACH transmission. Therefore, in an embodiment where two or more Rx chains are used together, it can be beneficial to the UEs of the second group that they have increased possibility of successful RACH signal transmission although sacrificing the RACH latency.

Optionally, the RACH response to the RACH signal of the second group can be sent together with or separately from the RACH response to the RACH signal of the first group.

As such, the embodiment of the present disclosure can achieve graceful degradation by decreasing the RACH latency of UEs near the BS by means of RACH operation at short intervals and accepting the RACH latency of UEs far from the BS by means of RACH operation at long intervals. Furthermore, at the expense of RACH latency of UEs far from the BS, possibility of successful RACH signal transmission can be increased and pollution (or noise) can be prevented due to suppression of RACH signal transmission.

While the embodiments illustrate an occasion where a group of the BS is divided by two classes and beamforming is operated by means of two Rx chains, the group can be divided by three or more classes or three or more Rx chains can be used for beamforming operation in other embodiments. For example, if there are three groups, time index i of the RACH opportunity for the first group and time index j of the RACH opportunity for the second group have a relation, j=4*i+i (if there are four beam directions). That is, when i=0, 1, 2, 3, 4, 5, 6, . . . , j=0, 5, 10, 15, . . . . Operation for a third group can also be applied, in which case an Rx chain #3 can further be included. Assuming that time index of the RACH opportunity for the third group is represented by k, k can have the following relation with i: k=4*4*i+i, and thus k=0, 17, 34, 51, . . . . Alternatively, beamforming can be operated such that two or more Rx chains are used for any single group.

Figure 6:
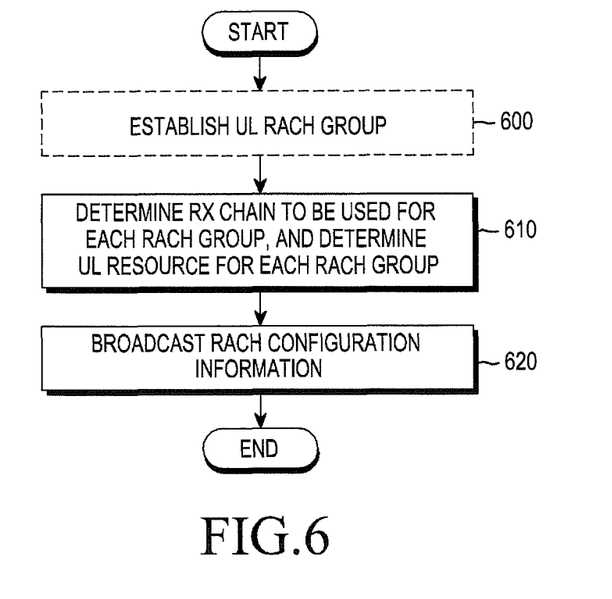
FIG. 6 is a flowchart illustrating an RACH operation method of a BS, according to an embodiment of the present disclosure.

FIG. 6 is a flowchart illustrating an RACH operation method of a BS, according to an embodiment of the present disclosure.

The BS can determine how many classes (or groups) a UL RACH group is divided into, because the UL RACH group depends on operating environments. In operation 600, the BS can also determine a 'threshold' to be used by a UE to determine the group to which the UE belongs.

In operation 610, the BS can determine at least one Rx chain to be used for RACH signal detection according to the number of the classes, and determine UL RACH resources to be allocated for RACH operation per group. In this regard, the BS can determine an Rx beam sweep period for performing RACH signal Rx beamforming for each group and a RACH response period.

In operation 620, information of the threshold for determining the group can be sent on a broadcasting channel with the RACH configuration information (including the RACH opportunity period, Rx beam sweep period, UL RACH resources allocated per group, etc.) Alternatively, the information of threshold can be sent on the broadcasting channel in the RACH configuration information.

The information of threshold to be sent with the RACH configuration information on the broadcasting channel can include threshold information to divide the group by two or more classes and further include attribute information to be a threshold for the determination.

As an example of the attribute information, downlink channel quality can be used. For example, the BS can divide the uplink RACH group by two classes and set a long-term average SINR value of −3 dB to be a threshold. In this case, the UE can measure a downlink long-term average SINR, and if the downlink long-term average SINR is less than −3 dB, perform RACH signal transmission and reception using the RACH configuration information for the second group, or otherwise if the downlink long-term average SINR is equal to or greater than −3 dB, perform RACH transmission and reception using the RACH configuration information for the first group. As another example, the BS can divide the group based on the RSS values. For example, when the RSS has a value equal to or greater than −80 dBm, it is determined to correspond to the first group.

As another example of the attribute information, path loss values can also be used. Accordingly, if the 'threshold' to determine the group has not been agreed between the UE and the BS, the BS can broadcast the attribute information and threshold information together as the 'threshold', or otherwise, if the 'threshold' has been agreed between the UE and the BS, the BS can send only the threshold information exclusive of the attribute information, together with the RACH configuration information on the broadcast channel.

Figure 7:
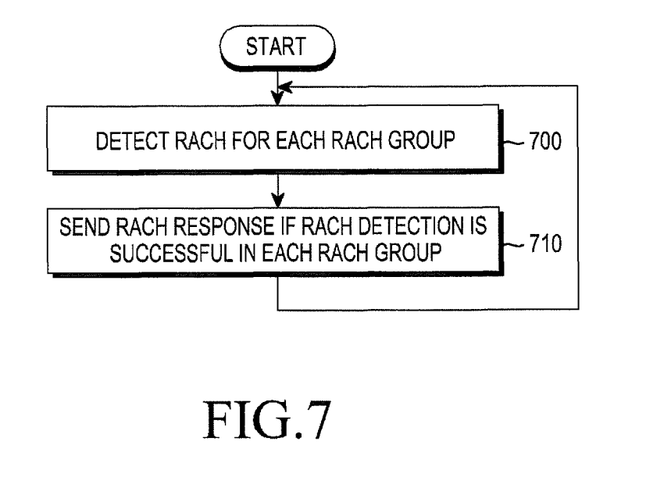
FIG. 7 is a flowchart illustrating an RACH signal detection and RACH response transmission method of a BS, according to an embodiment of the present disclosure.

FIG. 7 is a flowchart illustrating an RACH signal detection and RACH response transmission method of a BS, according to an embodiment of the present disclosure.

Prior to RACH signal detection, the BS can divide the RACH group classes in operation 600, determine corresponding RACH configuration information in operation 610, and broadcast the RACH configuration information in operation 620. The BS can operate an RACH signal detection method for each of the determined RACH group classes as follows:

Turning back to FIG. 5A, the BS can try to detect an RACH signal with the single Rx chain 410 to receive the RACH signal within the first RACH group (with small coverage). The BS can perform Rx beamforming in a set of directions by performing Rx beamforming with the Rx chain #1 410 once for every RACH opportunity in the Rx beam sweep period $T_{RACH\_SW1}$. The BS can try to detect the RACH signal by gathering signals received during the Rx beam sweep period of the first group $T_{RACH\_SW1}$. In operation 700, the BS can try to detect the RACH signal in every Rx beam sweep period of the first group $T_{RACH\_SW1}$.

In operation 710, the BS can send a response corresponding to successful detection in the RACH response period. The BS can proceed operation 700 to continue to detect the RACH signal.

Turning back to FIG. 5B, the BS can try to detect an RACH signal with the Rx chain #2 420 in addition to the Rx chain #1 410 to receive the RACH signal within the second RACH group (with large coverage). The BS can perform Rx beamforming with the Rx chain #2 420 in a set of directions by performing Rx beamforming once in every Rx beam sweep period of the first group $T_{RACH\_SW1}$ within the Rx beam sweep period of the second group $T_{RACH\_SW2}$. Specifically, the Rx chain #2 420 can gather received signals and try RACH detection by performing Rx beamforming at 0th, 10th, and 15th RACH opportunities. The BS can try to detect the RACH signal by gathering signals received during the Rx beam sweep period of the second group $T_{RACH\_SW2}$. In operation 700, the BS can try to detect the RACH signal in every Rx beam sweep period of the second group $T_{RACH\_SW2}$.

In operation 710, the BS can send a response corresponding to successful detection in the RACH response period. The BS can proceed operation 700 to continue to detect the RACH signal.

In this regard, the BS can operate the Rx chain #1 410 with the same operating method as that for the Rx chain #2 420 of the second RACH group or as that for the Rx chain #1 410 of the first RACH group.

Figure 8:
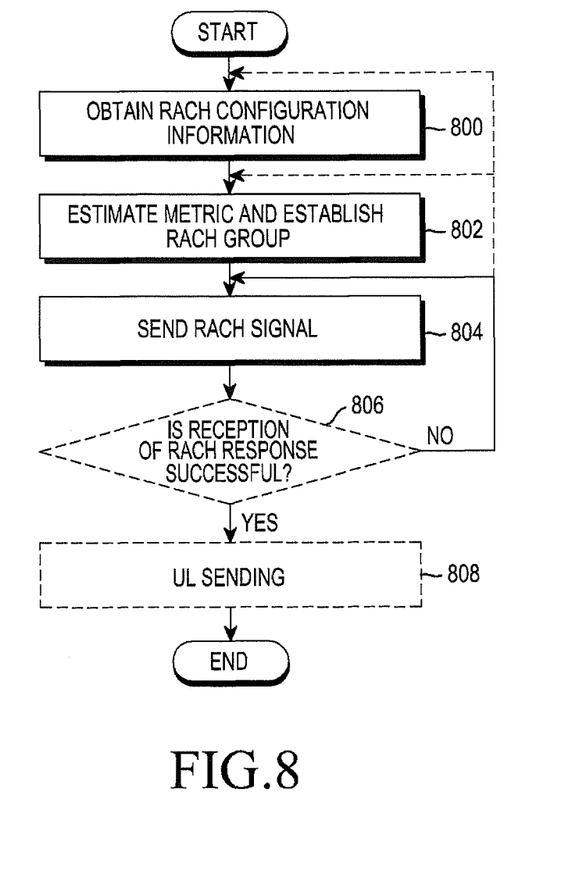
FIG. 8 is a flowchart illustrating an RACH signal transmission method of a UE, according to an embodiment of the present disclosure.

FIG. 8 is a flowchart illustrating an RACH signal transmission method of a UE, according to an embodiment of the present disclosure.

In operation 800, the UE can receive a sync signal SS from a BS, use the sync signal to be in sync with the BS, and then receive RACH configuration information from the BS.

The UE can determine an RACH group to which the UE belongs by performing metric estimation (measurement of the UE's wireless environment) using the received signal. Attribute information to be a threshold for the determination can be, for example, a downlink SINR, RSS or path loss (e.g., Maximum Allowed Path Loss (MAPL)), etc., which can be broadcast in the RACH configuration information or can have been agreed between the UE and the BS. In operation 802, the UE can measure downlink SINR, RSS, or path loss, and compare the measurement with a threshold included in the RACH configuration information, which is a threshold for group determination to determine its RACH group.

In operation 804, the UE can send the RACH signal using the RACH configuration information corresponding to the determined group (e.g., RACH opportunity, allocated RACH resource information, RACH response period and time, sequence type, repetitive transmission times for BS Rx beamforming, etc.).

In operation 806, the UE can try to receive an RACH response from the BS.

If the UE fails to receive the RACH response, in operation 804, the UE can try to send the RACH signal again, or in operation 802, try the metric estimation again to re-establish the RACH group and then try to send the RACH signal again, or in operation 800, receive and update a broadcast channel (e.g., BCH) broadcast from the BS, reflect the broadcast channel in new RACH signal transmission and try the RACH signal transmission again.

If the UE has received the RACH response successfully in operation 806, the UE can perform uplink transmission as required.

Figure 9:
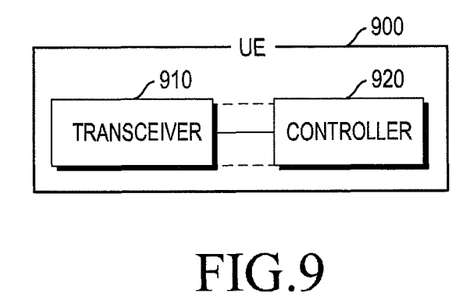
FIG. 9 is a block diagram of a UE, according to an embodiment of the present disclosure.

FIG. 9 is a block diagram of a UE, according to an embodiment of the present disclosure.

A UE 900 can include a transceiver 910 for sending RACH signals and receiving RACH responses, and a controller 920 for controlling the transceiver 910 to send the RACH signal or receive the RACH response.

In addition, the controller 920 can control overall RACH transmission operations of the UE as described in connection with FIG. 8. In this specification, operations of the UE can be understood as operations performed by the UE's controller 920.

The transceiver 910 and the controller 920 can be implemented separately as a Radio Frequency (RF) module and a processor, respectively, or can be incorporated in a single module.

The controller 920 can include a processor and a memory. The memory can store instructions, when read and interpreted by the processor, for carrying out the operations of RACH signal transmission and reception of the UE.

Figure 10:
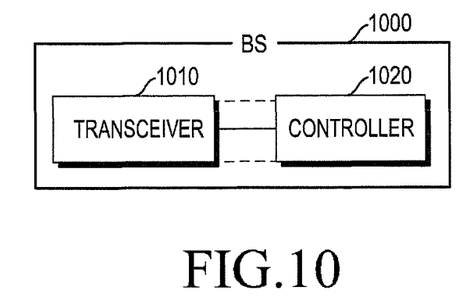
FIG. 10 is a block diagram of a BS, according to an embodiment of the present disclosure.

FIG. 10 is a block diagram of a BS, according to an embodiment of the present disclosure.

The BS 1000 can include a transceiver 1010 for performing at least one of broadcasting of RACH configuration information, reception of an RACH signal and transmission of an RACH response to the RACH signal, and a controller 1020 for controlling the transceiver 1010 to perform at least one of broadcasting of RACH configuration information, reception of an RACH signal and transmission of an RACH response to the RACH signal.

In addition, the controller 1020 can control overall operations of the BS as described above. In this specification, operations of the BS can be understood as operations performed by the controller 1020 of the BS 1000.

The transceiver 1010 and the controller 1020 can be implemented separately as a Radio Frequency (RF) module and a processor, respectively, or can be incorporated in a single module. The transceiver 1010 can include components associated with reception operations of the BS as illustrated in FIGS. 4A and 4B. For example, the transceiver 1010 can be implemented to have at least one Rx chain.

The controller 1020 can include a processor and a memory. The memory can store instructions, when read and interpreted by the processor, for carrying out the operations of the BS.

It is to be noted that the BS and UE are illustrated in FIGS. 4A, 4B, 9, and 10 by way of example, but not intended to limit the scope of the present disclosure. In other words, all the components included in FIGS. 4A, 4B, 9, and 10 are not shown as essential elements and thus, some of them can be omitted within the scope of the present disclosure.

It is to be noted that the flowcharts of FIGS. 6 to 8 are illustrated by way of example but not intended to limit the scope of the present disclosure. That is, operations as described with reference to FIGS. 6 to 8 are only provided by way of example, and not all the operations can be required to implement the present disclosure.

The foregoing operations can be implemented by program codes stored in a storage equipped in the BS or the UE. In other words, the controller can perform the foregoing operations by reading out and executing the program codes with a processor or the Central Processing Unit (CPU).

Various components and modules of the BS and the UE can be implemented in hardware, such as Complementary Metal Oxide Semiconductor (CMOS)-based logic circuits, firmware, software, or a combination thereof. For example, various electronic structures and methods can be practiced using electrical circuits, such as transistors, logic gates, and Application Specific Integrated Circuits (ASICs).

A beamforming system in accordance with the present disclosure can flexibly operate hardware resources owned by a BS by dividing an uplink RACH group into two or more groups for operation, and achieve graceful degradation by performing RACH operation on groups with small coverage at short intervals to decrease RACH delay and on groups with great coverage at long intervals to accept RACH delay.

Furthermore, a UE can minimize performance inference, i.e., pollution against other UEs due to the RACH signal, by determining its uplink RACH group and sending the RACH signal only at corresponding RACH opportunities.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a random access channel (RACH) by a base station (BS) in a communication system, the method comprising:
    dividing user equipments (UEs) located at a coverage of the BS into a first RACH group and a second RACH group based on a predetermined threshold compared to respective communication quality levels between the UEs of each RACH group and the BS;
    broadcasting RACH configuration information including information of a first receive (Rx) beam sweep period and information of a second Rx beam sweep period;
    performing first Rx beamforming for receiving a first RACH signal from at least one UE included in the first RACH group using a first Rx chain within the first Rx beam sweep period; and
    performing second Rx beamforming for receiving a second RACH signal from at least one UE included in the second RACH group using a second Rx chain within the second Rx beam sweep period,
    wherein the first Rx beam sweep period is repeated a predetermined number of times within the second Rx beam sweep period, and
    wherein the first Rx beamforming is configured to be performed by the base station for a set of beam directions within the first Rx beam sweep period, and the second Rx beamforming is configured to be performed by the base station for the set of beam directions within the second Rx beam sweep period.

2. The method of claim 1, wherein the RACH configuration information further includes at least one of an RACH opportunity period, information regarding uplink RACH resources allocated to a first Rx beam sweep period or the second Rx beam sweep period, an RACH response period for the first Rx beam sweep period or the second Rx beam sweep period, and the predetermined threshold.

3. The method of claim 2, wherein performing the first Rx beamforming comprises performing Rx beamforming once in every RACH opportunity period within the first Rx beam sweep period.

4. The method of claim 2, wherein performing the first Rx beamforming comprises performing Rx beamforming once in every RACH opportunity period within the first Rx beam sweep period by using the first Rx chain,
    wherein performing the second Rx beamforming comprises performing Rx beamforming once in the first Rx beam sweep period within the second Rx beam sweep period by using the second Rx chain.

5. The method of claim 2, wherein performing the second Rx beamforming comprises performing Rx beamforming once in the first Rx beam sweep period by using the second Rx chain.

6. The method of claim 3, further comprising, if a RACH signal is detected, sending an RACH response to the detected RACH signal in sync with the RACH response period.

7. The method of claim 1, wherein the predetermined threshold includes one of a signal to interference noise ratio (SINR), a received signal strength (RSS), and a maximum allowable path loss of a user equipment (UE).

8. A base station (BS) for operating a random access channel (RACH) in a communication system, the BS comprising:
    a first Rx chain;
    a second Rx chain; and
    a controller configured to divide user equipments (UEs) located at a coverage of the BS into a first RACH group and a second RACH group based on a predetermined threshold compared to respective communication quality levels between the UEs of each RACH group and the BS, and control a transceiver to broadcast RACH configuration information including information of a first receive (Rx) beam sweep period and information of a second Rx beam sweep period;
    control the first Rx chain to perform first Rx beamforming for receiving a first RACH signal from at least one UE included in the first RACH group within the first Rx beam sweep period; and
    control the second Rx chain to perform second Rx beamforming for receiving a second RACH signal from at least one UE included in the second RACH group within the second Rx beam sweep period,
    wherein the first Rx beam sweep period is repeated a predetermined number of times within the second Rx beam sweep period, and
    wherein the first Rx beamforming is configured to be performed by the base station for a set of beam directions within the first Rx beam sweep period, and the second Rx beamforming is configured to be performed by the base station for the set of beam directions within the second Rx beam sweep period.

9. The BS of claim 8, wherein the RACH configuration information further includes at least one of an RACH opportunity period, information regarding uplink RACH resources allocated to the first Rx beam sweep period or the second Rx beam sweep period, an RACH response period for the first Rx beam sweep period or the second Rx beam sweep period, and the predetermined threshold.

10. The BS of claim 9, wherein the controller is configured to control the first Rx chain to perform the first Rx beamforming once in every RACH opportunity period.

11. The BS of claim 9, wherein the controller is configured to:
    control the first Rx chain to perform Rx beamforming once in every RACH opportunity period within the first Rx beam sweep period; and control the second Rx chain to perform Rx beamforming once in the first Rx beam sweep period within the second Rx beam sweep period.

12. The BS of claim 9, wherein the controller is configured to control the second Rx chain to perform Rx beamforming once in the first Rx beam sweep period.

13. The BS of claim 10, wherein, if a RACH signal is detected, the controller is configured to send an RACH response to the detected RACH signal in sync with the RACH response period.

14. The BS of claim 8, wherein the predetermined threshold includes one of a signal to interference noise ratio (SINR), a received signal strength (RSS), and a maximum allowable path loss of a user equipment (UE).

* * * * *